Oct. 14, 1947.   G. H. KELLER   2,428,915
ENGINE SLUSHING SYSTEM
Filed Sept. 3, 1943
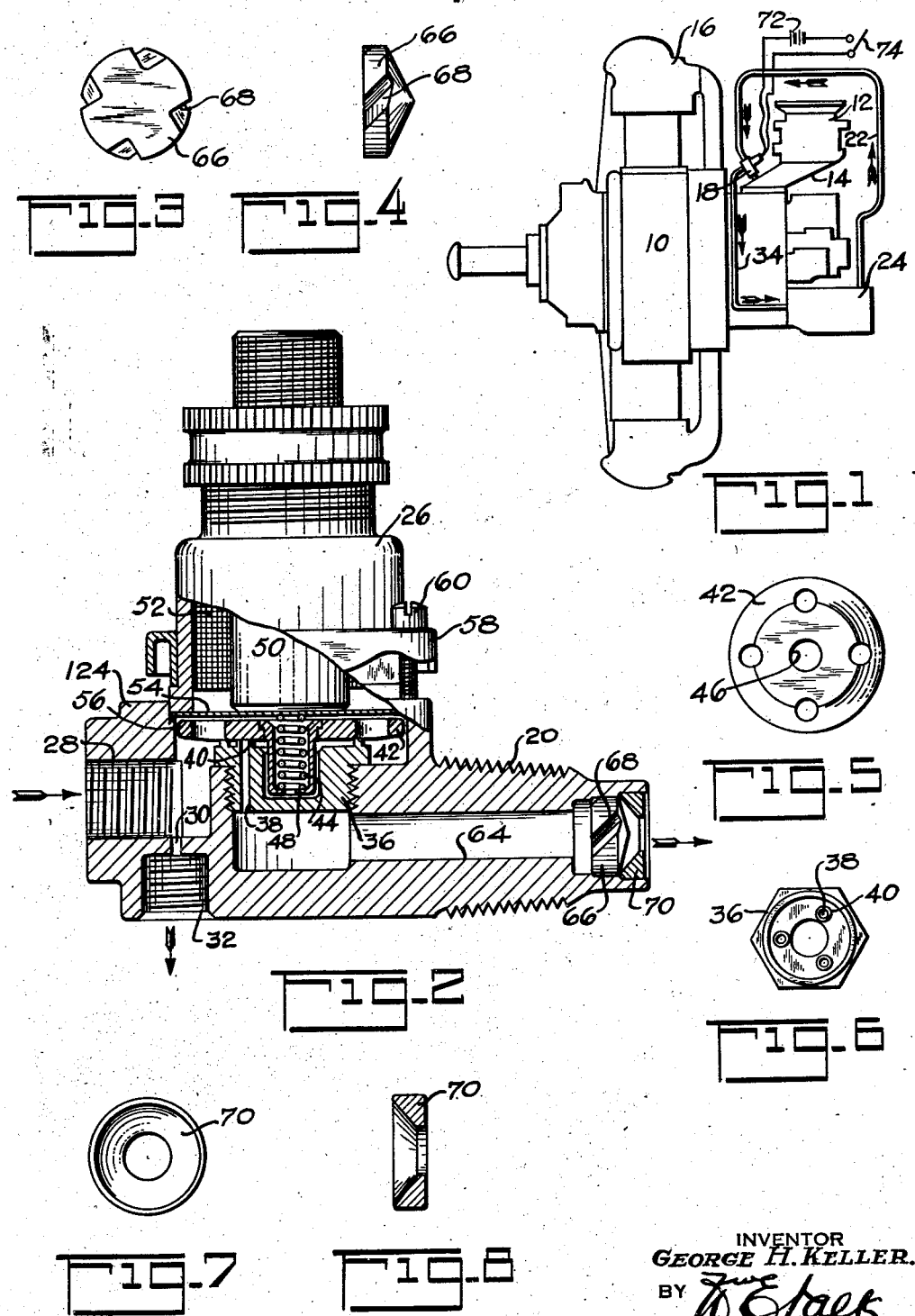
INVENTOR
GEORGE H. KELLER.
BY
ATTORNEY Patented Oct. 14, 1947

2,428,915

UNITED STATES PATENT OFFICE 2,428,915

ENGINE SLUSHING SYSTEM

George H. Keller, Radburn, N. J., assignor to Wright Aeronautical Corporation, a corporation of New York Application September 3, 1943, Serial No. 501,193

6 Claims. (Cl. 123—198)

This invention relates to internal combustion engines and is particularly directed to a novel method and apparatus for slushing the combustion chambers of an internal combustion engine during those periods in which the engine is shut down.

The use of present day leaded fuels tends to cause corrosion within the engine cylinders when the engine is shut down. It is an object of this invention to provide means for inhibiting or preventing such corrosion by the addition of oil into the engine induction system before the engine is stopped. In this way the engine cylinder walls are slushed or coated with oil before the engine is stopped, thereby preventing corrosion of the cylinder walls while the engine is shut down. It is recognized that slushing of the engine cylinders with oil in order to inhibit corrosion is not new but in the past such operations were quite cumbersome. It is an object of this invention to provide a simple slushing system, e. g., for an aircraft engine installation whereby the pilot or other operator may slush the engine simply by controlling a valve to which oil is supplied by the engine lubricating system. It is a further object of this invention to establish a method of slushing all of the cylinder walls of an internal combustion engine which is so coordinated with the procedure for stopping the engine that the slushing oil is not unnecessarily diluted by the engine fuel.

In installing such an oil-slushing system in an existing engine installation it is most feasible to run external oil lines to the slushing oil discharge nozzle. With such an external line, and particularly in an aircraft engine installation, there is danger of the oil congealing because of the cold temperatures encountered. Accordingly, it is a further object of this invention to provide a slushing system for discharging oil into the engine induction system such that there is little or no possiblity of the oil becoming cold or congealing upstream of the nozzle. Specifically, this is accomplished by providing a continual flow of warm engine oil up to the discharge valve and nozzle during engine operation.

Other objects of this invention will become apparent in reading the annexed detailed description in connection with the drawing in which:

Fig. 1 is a schematic view of a conventional radial cylinder aircraft engine incorporating the invention, Fig. 2 is an enlarged sectional view of the combined discharge valve and nozzle, Figs. 3 and 4, respectively, are plan and end views of the discharge nozzle plug, Figs. 5 and 6 are plan views of the movable valve element and the valve seat element, respectively, and Figs. 7 and 8, respectively, are plan and sectional views of the discharge nozzle element.

Referring to the drawing, a conventional radial cylinder aircraft engine indicated at 10 is provided with a carburetor 12 from which the engine combustion air and/or fuel flows through the duct or carburetor adapter 14 to the intake side of the usual engine-driven supercharger (not shown) and thence to the various engine cylinders 16. A combination solenoid valve and discharge nozzle housing 18 is threadedly secured to the wall of the carburetor adapter 14 by threads 20. Engine oil is delivered to the housing 18 through a conduit 22 by means of the conventional engine-driven oil pump, generally indicated at 24.

The housing 18 consists of a valve body portion 124 and a solenoid portion 26. The valve body portion 124 has an inlet port 28 to which engine oil is delivered by the conduit 22. A restricted orifice 30 establishes communication between the inlet port 28 and a by-pass port 32 connected to a conduit 34 leading back to the engine sump, engine scavenger pump, or oil reservoir. With this arrangement there is a continual circulation of oil from the engine-driven oil pump through conduit 22 to the valve housing 18 and thence through by-pass conduit 34 back to the engine lubrication system. The valve body portion 124 is provided with a valve seat member 36 threadedly secured therein and having a plurality of oil passages 38 about which annular valve seats 40 are formed. A movable disc-type valve element 42 is disposed over these seats and urged into engagement therewith by a spring 44, and the valve element 42 is provided with a central opening 46 and with a cup-shaped member 48 having a flange portion seated within a counterbore in the opening 46. The cup-shaped member 48 extends down into a recess within the valve seat member 36 and the spring 44 is disposed between the bottom of the cup-shaped member and the core 50 of a solenoid 52. A flexible diaphragm 54 extends across the valve chamber under the solenoid to prevent oil from getting up into the solenoid.

The solenoid housing 26 is clamped down against a flange 56 within the valve housing by means of a collar 58 and bolt 60, the periphery of the flexible diaphragm being secured between this flange and the abutting end of the solenoid housing. The movable valve member 42, when seated against the valve seats 30 by the spring 44, is disposed in clearance relation with the end of the solenoid core 50. Accordingly, when the solenoid is energized, the valve member 42 is raised off its seat to thereby open the valve for oil flow from the inlet port 28 through the oil passages 38 and to the outlet passage 64. The particular details of the solenoid valve herein described form no part of the present invention and any suitable solenoid or other remotely controlable valve may be substituted therefor.

The discharge end of the outlet passage 64 is provided with a spiral-type nozzle plug 66 having a series of helically disposed V-shaped grooves 68 cooperating with a conical nozzle element 70. Details of this nozzle also form no part of the present invention, except that the discharge nozzle should be located as close as possible to the valve in order to prevent the accumulation of a large quantity of cold oil between the valve and nozzle. The presence of a large quantity of cold oil between the valve and nozzle would interfere with the proper atomization and discharge of oil from the nozzle into the engine induction system. This combination valve and discharge nozzle is threadedly supported in and extends through the wall of the carburetor adapter 14 whereby, when the solenoid valve is opened, warm oil is immediately atomized and discharged through the nozzle 70 into the air or combustible mixture from the carburetor 12. The solenoid 52 is connected to a source of energy 72 and to a switch 74, preferably located for easy access by the pilot.

The operation of the above described engine oil slushing system is as follows: During engine operation warm engine oil is continually pumped through conduit 22 to the inlet side of the valve member 42 and this oil returns to the engine lubrication system through the restricted orifice 30 and conduit 34. In this way warm engine oil is always available at the valve and there is no danger of the oil congealing or becoming cold at the inlet side of the valve. Just before the engine is to be stopped the solenoid 52 is energized to open the valve, whereupon the warm oil is atomized and discharged through the nozzle into the engine induction system at the carburetor adapter. When oil has entered all of the engine cylinders, as indicated, e. g., by the smoky exhaust from all of the engine cylinders, the usual carburetor fuel mixture control is adjusted to shut off the fuel supply but the oil injection is continued until the engine stops, whereupon the engine ignition circuit is interrupted, e. g., by grounding the engine magneto and the solenoid oil slushing valve is closed. In this way the engine runs out with a minimum of fuel so that the fuel does not unnecessarily dilute the oil discharged into the engine cylinders and the engine soon stops because, even though the engine cylinder head temperatures may be sufficient to ignite the oil, the mixture is much too lean. If the engine were stopped simply by cutting off the ignition, the engine would continue to run for some time on the oil and fuel, since the oil seems to have a relatively low ignition point. In this latter case most of the oil would be burned within the engine cylinders and very little would be available for slushing or coating the walls of these cylinders. Accordingly, it is desirable that the mixture control be adjusted to shut off the fuel supply before the ignition is cut off or at least at the same time that the ignition is cut off.

In shutting down a particular engine it was found that injection of oil for a period of approximately three quarters of a minute to one minute was sufficient to get oil into all of the cylinders before the fuel mixture control was operated to cut off the fuel supply. It should be noted, however, that the proper length of time before the mixture control is adjusted to cut off the fuel supply after the oil slushing valve has been opened, obviously depends on the particular engine involved. If this time is made too short oil may not reach all of the cylinders before the engine is stopped and, if made too long, burning of the oil within the engine cylinders may cause excessive carbon deposits.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. Mechanism for introducing a slushing fluid into an internal combustion engine, said mechanism including a nozzle adapted to discharge a slushing fluid into the induction system of said engine, a valve disposed immediately adjacent to said nozzle, means for supplying said fluid to the inlet side of said valve while the engine is in operation, and a restricted by-pass passage at the inlet side of said valve whereby a continuous flow of said fluid is maintained to the inlet side of the valve during engine operation.

2. Mechanism for slushing the combustion chamber walls of an internal combustion engine, said mechanism comprising a valve, means to supply engine oil to said valve, a restricted by-pass oil passage adjacent the inlet side of said valve and through which engine oil continually flows during engine operation, and a nozzle adjacent the outlet side of said valve adapted to discharge oil into the induction system of said engine when said valve is open.

3. Mechanism for slushing the combustion chamber of an internal combustion engine, said mechanism comprising an integral valve and discharge nozzle assembly, means to supply oil under pressure to said valve, a restricted by-pass oil passage adjacent the inlet side of said valve and through which said oil continually flows during engine operation, said nozzle being disposed so as to discharge oil into the induction system of said engine when said valve is open.

4. Mechanism for introducing a slushing fluid into an internal combustion engine, said mechanism comprising a nozzle adapted to discharge a slushing fluid into the engine, a valve for controlling the flow of said fluid to said nozzle, and means for maintaining a continuous flow of said fluid past the inlet side of said valve during engine operation and while said valve is closed to prevent flow of said fluid to said nozzle.

5. Mechanism for introducing a slushing fluid into an internal combustion engine, said mechanism comprising a nozzle adapted to discharge a slushing fluid into said engine, a valve for controlling the flow of said fluid to said nozzle, means for supplying slushing fluid to the inlet side of said valve, and a by-pass passage for said fluid at the inlet side of said valve.

6. Mechanism for introducing a slushing fluid into an internal combustion engine, said mechanism comprising a nozzle adapted to discharge a slushing fluid into said engine, a valve for controlling the flow of said fluid to said nozzle, means for supplying slushing fluid to the inlet side of said valve while said engine is in operation, and a by-pass fluid passage at the inlet side of said valve whereby a continuous flow of fluid is maintained to the inlet side of said valve during engine operation.

GEORGE H. KELLER.

REFERENCES CITED

The following references are of record in the file of this patent:

UNITED STATES PATENTS

| Number | Name | Date |
|---|---|---|
| 2,199,912 | Eilers | May 7, 1940 |
| 1,810,193 | Thomas | June 16, 1931 |
| 1,597,267 | De Clairmont | Aug. 24, 1926 |
| 2,277,749 | Echel et al. | Mar. 31, 1942 |
| 2,259,656 | Neumann | Oct. 21, 1941 |
| 1,852,229 | Blanchard | Apr. 5, 1932 |